United States Patent
Schumacher

(10) Patent No.: US 6,886,316 B2
(45) Date of Patent: May 3, 2005

(54) MOWING BLADE COMPRISING A BLADE BAR COMPOSED OF BAR SECTIONS

(76) Inventor: Heinrich-Günter Schumacher, 11, 57612, Eichelhardt (DE)

( * ) Notice: Subject to any disclaimer, the term of this patent is extended or adjusted under 35 U.S.C. 154(b) by 0 days.

(21) Appl. No.: 10/489,054

(22) PCT Filed: Sep. 28, 2001

(86) PCT No.: PCT/EP01/11269

§ 371 (c)(1),
(2), (4) Date: Mar. 9, 2004

(87) PCT Pub. No.: WO03/028435

PCT Pub. Date: Apr. 10, 2003

(65) Prior Publication Data

US 2005/0028505 A1 Feb. 10, 2005

(51) Int. Cl.[7] .............................................. A01D 34/13
(52) U.S. Cl. .......................................... 56/296; 56/300
(58) Field of Search ........................ 56/296, 299, 300, 56/302, 303; 411/169; 403/341

(56) References Cited

U.S. PATENT DOCUMENTS

| | | | | |
|---|---|---|---|---|
| 235,855 A | * | 12/1880 | Deevy | 56/298 |
| 1,218,511 A | * | 3/1917 | Berglund | 56/302 |
| 1,233,950 A | * | 7/1917 | Aidlotte | 56/300 |
| 1,340,868 A | * | 5/1920 | Aidlotte | 56/300 |
| 2,216,790 A | * | 10/1940 | Sebade | 56/303 |
| 4,021,999 A | * | 5/1977 | Case | 56/298 |
| 4,805,390 A | | 2/1989 | Majkrzak | |
| 4,854,114 A | | 8/1989 | Speck | |
| 4,942,728 A | | 7/1990 | Loring | |
| 5,040,363 A | | 8/1991 | Limburg et al. | |
| 5,161,357 A | * | 11/1992 | Braunberger et al. | 56/3 |

FOREIGN PATENT DOCUMENTS

DE 9016099 U 3/1992

OTHER PUBLICATIONS

International Search Report for PCT/EP01/11269, mailed May 28, 2002, ISA/EPO.

* cited by examiner

*Primary Examiner*—Arpad Fabian Kovacs
(74) *Attorney, Agent, or Firm*—Harness, Dickey & Pierce, P.L.C.

(57) ABSTRACT

A mowing blade that performs an oscillating linear motion, has a blade bar, with at least two bar sections that are located one behind the other along a longitudinal axis. The front faces of the sections abut one another and have respective recesses. The thickness of the bar sections is reduced in recessed areas. A connecting fish plate, which can for example be constructed from a high strength material, is placed in the recesses. The blade sections, bar sections and fish plate are connected by cap screws and securing nuts. A blade section covers the butt joint between the two bar sections. The configuration enables absorption of inertial forces caused by the backwards and forwards reciprocating motion and compressive forces that result from the motion in the connection region.

8 Claims, 2 Drawing Sheets

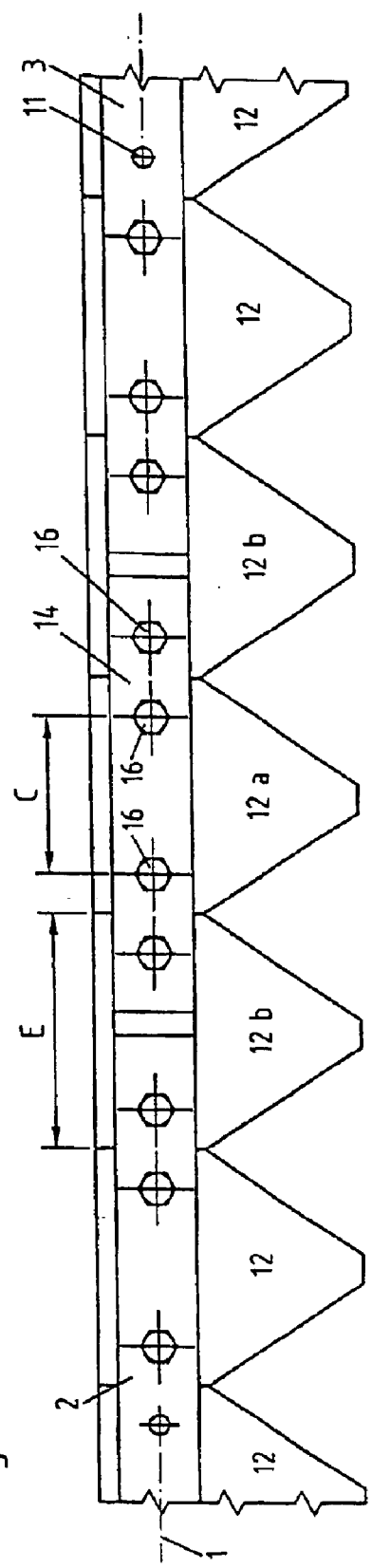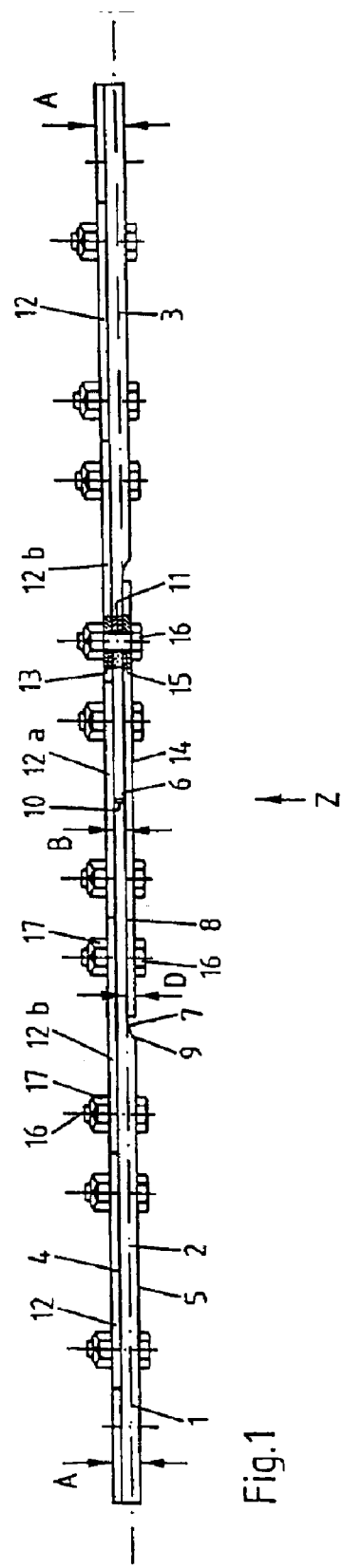

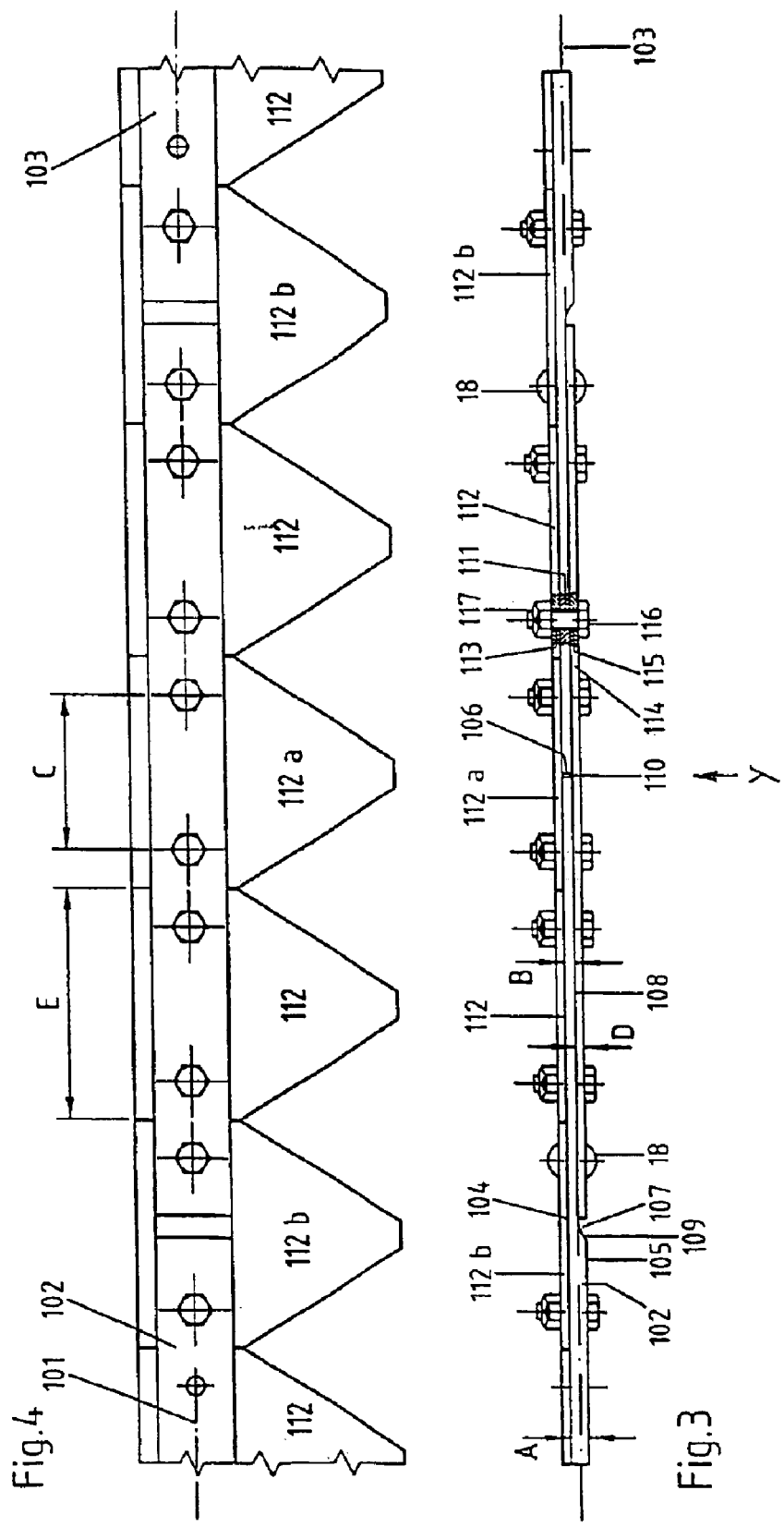

MOWING BLADE COMPRISING A BLADE BAR COMPOSED OF BAR SECTIONS

FIELD OF THE INVENTION

The invention relates to an oscillating linear motion mowing sickle including a sickle bar. The sickle bar has at least two bar sections positioned one behind the other along a longitudinal axis. The at least two bar sections are connected to each other by a connection member.

BACKGROUND OF THE INVENTION

Mowing sickles are preferably used in harvesting machines, for example combine harvesters, to mow stem stock. Because of the immense mowing widths, mowing sickles are achieved with a length of 9 meters or more. The sickles are reciprocally moved by a drive. Blades attached to the sickle bar cut the harvesting crop against fingers which form counter cutting edges. Depending on use, the blades undergo more or less strong wear. During harvesting, the blades and even the whole mowing sickle often need to be exchanged. Mowing sickles with the above stated length are quite flexible as the sickles generally have, in cross-section, a relatively thin rectangular profile. Thus, transport is cumbersome from the manufacturer to the user of the machine in the field. The cost of packaging and transport are, therefore, higher than the mowing sickle itself. Because of this reason, the sickle is separated into sections or partial bar sections, respectively, which can be connected at the harvesting machine upon their arrival. Sectional sickles can have a length of around 3 meters. Thus, for example, a total of three sections can be shipped together and connected to a 9 meter long mowing sickle. Such lengths are still easy to package and transport. It necessitates, however, that the three sections must be connected to each other at two connection points. These connection points undergo high mechanical loadings. For example, as a rule at least 500 double strokes are carried out per minute. This leads to over a thousand loading changes. Beside the loading force, which results from the acceleration and slowing down of the reciprocating masses, the cutting forces still must be transmitted.

U.S. Pat. No. 4,805,930 describes a mowing sickle with a sectioned sickle bar. The bar sections are reduced, respectively, in their connection area to half of their thickness and overlap each other. In this condition, they are connected to each other by screws. Here, normal round shank screws are used.

U.S. Pat. No. 4,854,114 proposes, instead of normal round shank screws, an oval shank in cross-section to provide, in the loading direction of the mass forces, a larger cross-section, which undergoes shearing due to the oscillating movement. Beside the shearing forces, bending forces are also produced. The bending forces act especially on the connection points since the mowing sickle cannot be precisely vertically guided because of its length.

To absorb bending forces more effectively, U.S. Pat. No. 4,805,390 proposes to arrange a mowing blade with four bores across a connection point to cover the butt joint. The bending forces produced in the connection area are partially absorbed by the mowing blade. A disadvantage in this embodiment is due to the blades having a common width of 76.2 mm, four bores are arranged very close to each other. Also, corresponding bar section bores have to be analogously provided at a small distance to each other. No improvement is achieved, but danger of breakage exists in the area of the connection. A further disadvantage is, since commonly used mowing blades have only two bores, special mowing blades are required with four through bores. Furthermore, it is also possible, but only with low success and high expenditure, to heat treat the material in the area of the connection to provide improved strength to reduce the breakage danger. Shims, arranged abutting the blade bar section cannot be used. This is due to the fact that shims require special designs in the area of the mowing finger.

SUMMARY OF THE INVENTION

The invention provides a mowing sickle with a sickle bar that includes several bar sections. The sickle is designed so that high forces, resulting from the oscillating movement of the masses, can be absorbed in the connection area. Furthermore, an improved absorption of the bending (buckling) forces may be achieved.

According to the invention, a mowing sickle for reciprocating movement comprises a sickle bar with at least two bar sections arranged one behind the other along a longitudinal axis. The at least two bar sections have a continuous first attachment face. A second face is arranged parallel and distanced at a first distance from the first face. A front face is at the longitudinal ends of the bar section. A third face starts from at least one of the front faces and is limited by a recess. The third face is arranged parallel to the attachment face at a second distance from the attachment face. The distance is smaller than the first distance. First through bores are provided in a length portion through the second face and the third face. The first through bores are arranged at predetermined distances to each other and to the front face along the longitudinal axis. The bar sections are arranged with a front face abutting each other to form a butt joint.

Blades have, respectively, two second through bores arranged at a distance. The blades abut the attachment face and one blade covers the butt joint. A connecting fish plate abuts the third faces of the bar sections abutting each other. The fish plate covers the butt joint and has third corresponding bores to the first through bores provided in the third face. Connection members are inserted into the first through bores, second through bores and third through bores to connect the bar sections, the blades and the fish plate to each other.

An advantage of this embodiment is that the blades participate more in the transmission of the forces. Also, an improved material can be used for the connecting fish plate, which is suitable to absorb larger forces, i.e. the loading from the reciprocating moving masses as well as the resulting bending load. Thus, the connection area can be designed such that the connection area does not exceed the dimensions of the bar sections in the area outside the recesses.

Force transmission is enhanced when a blade is aligned with a second through bore to a first through bore in the area of a recess and when a second through bore is arranged in a length portion outside the recess. Therefore, anchorage of this blade is achieved in the area of the bar section with full material thickness and in an area the connecting fish plate. The blade produces an improvement of the force transmission.

The connection areas, depending upon the force relationships, can be formed differently concerning the length of the recesses along the longitudinal axis. In a first embodiment, the connecting fish plate has four third through bores. The bar sections abut each other and have, respectively, two first through bores in their recesses. Alternatively, the connecting fish plate has eight third through bores and the bar sections abutting each other, have in their recesses, respectively, four first through bores. Thus, this achieves an extended overlapping area with the connecting fish plate.

Preferably, the connecting fish plate is made from a high-strength steel such as spring steel. Accordingly, the bending forces can be advantageously taken up and do not lead to damage. The connection can be designed so that the thickness of the connecting fish plate corresponds to the maximum difference of the first distance minus the second distance. Although, advantageous, head screws and nuts are provided which lead to a quick exchange of the bar sections or of the individual blades, it is also possible to use rivets. If screws are used, it is ensured that the screws do not get loose.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a front view of a partial portion of two bar sections of a sickle bar with the corresponding mowing blades in the area of the connection of the two bar sections;

FIG. 2 is a plan view in the direction of the arrow Z of FIG. 1;

FIG. 3 is a view corresponding to FIG. 1 in reference to a further embodiment in which the overlapping area of the connecting fish plate is formed longer than in the embodiment of FIGS. 1 and 2; and FIG. 4 is a plan view in the direction of the arrow Y of FIG. 3.

DETAILED DESCRIPTION OF THE PREFERRED EMBODIMENTS

The following description of the preferred embodiment(s) is merely exemplary in nature and is in no way intended to limit the invention, its application, or uses.

FIGS. 1 and 2 are described together in the following. FIGS. 1 and 2 only show a limited longitudinal portion of a mowing sickle. The butt joint of a two bar sections 2, 3 is represented in more detail. The two bar sections 2, 3 are arranged behind one another along the longitudinal axis 1. The two bar sections 2, 3 are formed identically in that area, in which they are connected to each other, so that only a description of the special design in this area in reference to the first bar section 2 is given.

The first bar section 2 is formed with a continuously flat attachment face 4. Further, it includes a second face 5 arranged parallel to the attachment face 4 defining a first distance A between the two faces. A third face 8 starts from a front face 6 and ends at a recess 7. A smaller distance in relation to the second face 5, namely the second distance B, is defined between the third face 8 and the attachment face 4. The recess 7 ends with a transition face 9 at the second face 5. The second distance B is formed smaller than the first distance A.

Further it is visible that the two bar sections 2, 3 are arranged abutting each other at a butt joint 10. Starting from the butt joint 10, the second bar section 3 has a recess corresponding to that of the first bar section 2. The design of the second bar section 3 is a mirror image symmetric to the first bar second 2 in reference to a symmetry plane, represented by the butt joint 10.

First through bores 11 are arranged in the area of the recess 7 and in the further area of the first bar section 2. Blades 12 are arranged on the attachment face 4 of the bar sections 2, 3. The blades 12 have two second through bores 13. A distance C is arranged between the second through bores 13. Each blade 12 has a width E. The blades 12 are arranged one behind the other abutting each other along the longitudinal axis 1. One of the blades 12, namely blade 12a, overlaps the butt joint 10. Thus, one of its second through bores 13 is aligned with one first through bore 11 of the first bar section 2. The other of the two second through bores 13 is aligned with a corresponding first through bore 11 of the second bar section 3. Further, blades 12b, arranged next to the blade 12a, are arranged with the second through bores 13 such that they correspond to a first through bore 11, still arranged in the area of the recess 7, in the first bar section 2. The corresponding first through bore is arranged relative to the other second through bore of the blade 12b in a length portion where the attachment face 4 is thicker since it is arranged with the larger distance A to the second face 5. The blade 12b also covers the transition face 9 on the side facing away from the third face.

A connecting fish plate 14 is arranged in the two recesses of the two bar sections 2, 3. The fish plate 14 has a thickness D which is the maximal difference of the first distance A minus the second distance B, so that it does not project beyond the second face 5. The fish plate 14 has a total of four third through bores 15. Accordingly, two third through bores 15 are arranged relative to the first through bores 11 in the area of the corresponding recess 7 of the first bar section 2. A corresponding arrangement is provided for the second bar section 3. The connecting fish plate 14, therefore, covers the butt joint 10. It can be made from high-strength material, for example spring steel. The portions of the first bar section 2 and the second bar section 3, reduced in size in the area of the recess 7 where the attachment face 4 and the third face 8 are arranged with a reduced distance B to each other, are, therefore, supported on two sides. On one side, they are supported by the connecting fish plate 14 and on the other side by the blades 12a, 12b. Connection head screws 16 in connection with nuts 17 serve as the connection between the elements. Thus, to connect the two bar sections 2,3, the connection mechanism includes the required blades 12. Thus, the pitch is maintained, which is predetermined by the bore distance C of the second through bores 13 of the blades 12.

Of the two bar sections 2, 3 only the abutting portions are represented. They are formed as a whole longer as described before with a length of around three meters, where two of such bar sections 2, 3 abut each other. A bar section, for example, the bar section 2 can be formed at one end with a connection head for connection to a sickle drive. The blades are guided for example in mowing fingers, as those shown in U.S. Pat. No. 4,854,114, the specification and drawings of which are herein expressly incorporated by reference.

In the embodiment according to FIGS. 1 and 2, the connection area is designed so that the connecting fish plate 14 is connected to three blades.

The layout of the connection area, described by reference to the two bar sections 2,3 can be applied to several or two bar sections. In the embodiment according to FIGS. 3 and 4, only one difference exists with respect to the embodiment according to FIGS. 1 and 2. The connection area is formed longer. The description in connection with FIGS. 1 and 2 is also valid for the components of the embodiment according to FIGS. 3 and 4. Where the same components are used, reference numbers are selected, compared to those of the corresponding components of FIGS. 1 and 2 with an increased numerical value of one hundred. Insofar, it is referred, with respect to the description of these components, to the description of the corresponding components in connection with FIGS. 1 and 2. In the following, however, the differences are described in more detail.

Compared to the embodiment according to FIGS. 1 and 2, the recess 107 is formed longer along the longitudinal axis 101 in the first and second bar sections 102, 103. Thus, a larger length portion of the first bar section 102 is provided with the reduced second distance B between the second face 105 in relation to the attachment face 104. In this area, a total of four first through bores 111 are provided. Thus, a total of five blade sections 112a, 112b participate in the connection. The connecting fish plate 114 is also formed correspondingly longer. To indicate that other connection members may be used to connect the first bar section 102 to the second bar section 103, rivets are shown in the blade 112a, 112b and the connecting fish plate 114 at two positions. In the embodiment according to FIGS. 3 and 4, the load is distributed onto a larger number of head screws than in the embodiment according to FIGS. 1 and 2.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mowing sickle comprising:
   a sickle bar having at least two bar sections arranged one behind the other along a longitudinal axis, said at least two bar sections include a continuous first attachment face, a second face arranged parallel and spaced a first distance from said first attachment face, and a front face each at a longitudinal end of said section;
   said at least two bar sections including a third face starting from at least one of the front faces and limited by a recess, said third face arranged parallel to the attachment face and spaced a second distance from the attachment face, said second distance being smaller than the first distance;
   first through bores are provided in a length portion of said at least two bar sections such that at least one bore extends through the second face and one bore through the third face, said first through bores being arranged at a predetermined distance to each other and to the front face along the longitudinal axis; and
   said at least two bar sections are arranged with said front face abutting each other and forming a butt joint;
   blades having two second through bores arranged at a distance with respect to one another, one of said blades abutting the attachment face and covering the butt joint;
   a connecting fish plate abutting the third faces of the bar sections abutting each other and said connecting fish plate covering the butt joint and having third bores corresponding to the first through bores provided in the third face; and
   connection members inserted into the first through bores, second through bores and the area of the third face, the third through bores, said connecting members connect the bar sections, the blades and the connecting fish plate in the area of the third faces to each other.

2. The mowing sickle according to claim 1, wherein one blade is aligned with a second: through bore to a first through bore in the area of the recess and with a second through bore in a length portion outside the recess.

3. The mowing sickle according to claim 2, wherein the connecting fish plate has four third through bores and the bar sections abutting each other, have, respectively, in their recesses two first through bores.

4. The mowing sickle according to claim 3, wherein the connecting fish plate has eight third through bores and the bar sections abutting each other, have in their recesses, respectively, four first through bores.

5. The mowing sickle according to claim 1, wherein the connecting fish plate is made from a high-strength steel such as spring steel.

6. The mowing sickle according to claim 1, wherein the thickness of the connecting fish plate corresponds to the difference between the first distance minus the second distance.

7. The mowing sickle according to claim 1, wherein the connecting members are head screws and nuts.

8. The mowing sickle according to claim 1, wherein the connecting members are rivets.

* * * * *